US006050869A

United States Patent [19]

Kellett

[11] Patent Number: 6,050,869

[45] Date of Patent: Apr. 18, 2000

[54] MARINE RESCUE SNARE

[76] Inventor: K. Craige Kellett, R.R. #1, Minden, Ontario, Canada, K0M 2K0

[21] Appl. No.: 09/344,119

[22] Filed: Jun. 24, 1999

[51] Int. Cl.[7] ................................ B63C 9/00; B63C 9/26; A01K 29/00

[52] U.S. Cl. .................................... 441/83; 441/84; 182/3

[58] Field of Search ........................ 114/221 R; 441/136, 441/80, 81, 83, 84, 129; 182/3, 6, 7; 119/907

[56] References Cited

U.S. PATENT DOCUMENTS

| | | | |
|---|---|---|---|
| 4,596,530 | 6/1986 | McGlinn . | |
| 4,599,073 | 7/1986 | Fryer et al. . | |
| 4,599,074 | 7/1986 | Beckly . | |
| 4,661,077 | 4/1987 | Griffith et al. . | |
| 4,713,033 | 12/1987 | Cameron . | |
| 5,279,386 | 1/1994 | Cearley | 182/3 |
| 5,485,810 | 1/1996 | Sporn | 119/792 |
| 5,584,736 | 12/1996 | Salvemini . | |

*Primary Examiner*—S. Joseph Morano
*Assistant Examiner*—Patrick Craig Muldoon
*Attorney, Agent, or Firm*—Ridout & Maybee

[57] ABSTRACT

A floatable marine rescue snare is provided comprising one or more buoyant elongate rods axially connected by a tie line and formed in a loop, with a slippage device fixed to one end of the snare and slidably engaged with a portion of the snare between its two ends. The tie line connects to a rescue rope by which it may be thrown to a victim. Once looped around the upper torso of the victim, the snare can be tightened by pulling on the rescue rope to secure a rescue link while the buoyant body of the snare maintains the victim afloat.

9 Claims, 6 Drawing Sheets

MARINE RESCUE SNARE

BACKGROUND OF THE INVENTION

The present invention relates to apparatus and methods for marine rescue, particularly in man overboard situations.

The difficulties involved in throwing out a buoyant life ring ("life preserver") to a victim in distress in the water is well known. A number of devices have been contrived which are floatable weighted objects of a shape easier to throw than the simple annular life ring. However, any devices which contemplate that the victim effectively grasp a floatable member and/or lifeline in order to be pulled to safety is subject to the limitation that the victim may be in a state of panic or shock rendering it difficult for him or her to maintain a grasp upon the device.

Retrieval/rescue devices of a different character have been devised which are in the nature of snares that can be tightened round the torso of a victim, e.g., U.S. Pat. No. 4,599,074 (Beckly) and U.S. Pat. No. 4,596,530 (McGlinn). These typically include a rigid boom and a flexible strap capable of forming a loop for wrapping around the victim. Upon pulling, the loop tightens around the victim for effecting a rescue. Such snare devices are not buoyant, nor meant to be thrown out freely to the vicinity of the victim. Rather, the snaring mechanism is affixed to the end of a boom or other rigid member which is extended to the person in the water.

SUMMARY OF THE INVENTION

It is an object of the present invention to provide a marine rescue snare which is buoyant and simple in construction.

With a view to achieving this and other objects of the invention, there is provided a floatable marine rescue snare with a first and second end, which comprises one or more flexible, buoyant elongate members such as polyethylene flotation foam rods. A flexible tensile member turns through an axial channel of the buoyant member(s). In use, the snare is formed into a loop, with slippage means fixed to one end of the snare and slidably engaged with a portion of the snare between its two ends.

The snare can be attached to a rescue rope and thrown to the victim. Once the loop of the snare is around his or her upper torso, the snare is simply tightened up by pulling on the rescue rope attached to the first end of the snare, to secure a rescue link with the victim and keep him or her buoyant.

BRIEF DESCRIPTION OF THE DRAWINGS

The invention will be further described, by way of example only, with reference to the accompanying drawings, in which.

DETAILED DESCRIPTION

Figure 1A:
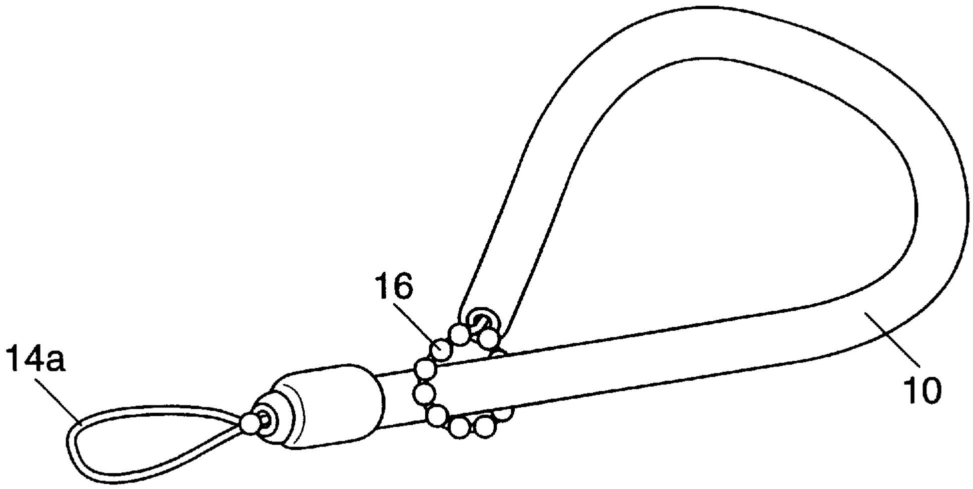
FIG 1*a* is a diagrammatic representation of a marine rescue flotation snare according to the present invention.
Figure 2:
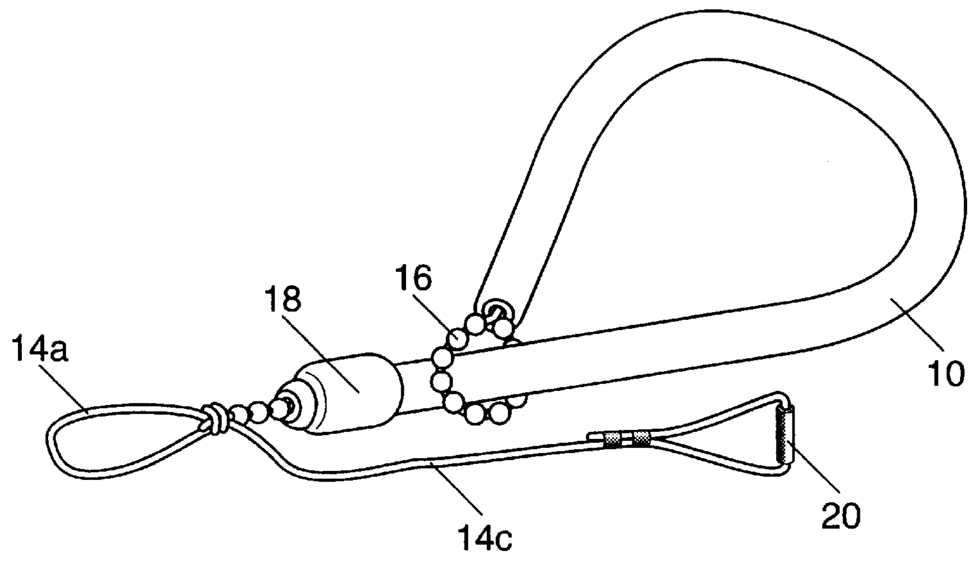
FIGS. 2 and 3 are diagrammatic external views of variants of the embodiment of FIGS. 1*a* and 1*b,* the interior construction being no different from that embodiment.
Figure 3:
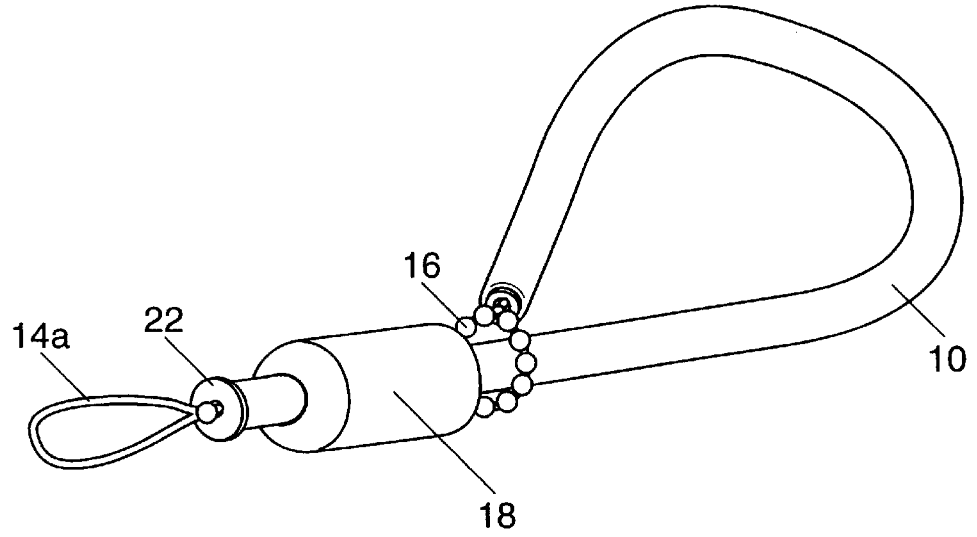

FIG. 1*a*/1*b,* FIG. 2 and FIG. 3 show variants of an embodiment of an invention in which a central channel runs axially along the centre of a flexible, buoyant rod 10. Closely fitted within the central channel is a length of polyethylene or like elastomeric tubing 12 running from one end to the other. Along the interior of the polyethylene tube there is threaded a strong and flexible tensile member 14. This may be made of any of a number of materials of the kind suitable for use as rescue ropes. In a preferred embodiment, the tensile member is a rope fabricated of a polypropylene core with an outer polyester sheath.

In the variant of FIGS. 1*a* and *b,* at a first end of the snare, tensile member 11 is secured in a tie loop 14*a* for a rescue rope (not shown), and at the other end to slippage or roller means 16 which hold the snare in the desired loop but allow for the loop to be enlarged or contracted. The illustrated example of slippage/roller means comprises a ring of polyethylene beads which run on a looped end of tensile member 14. The bead-ring slider 16 may be prevented from coming right off the end of the snare when it is opened to its maximum position by a fixed, rigid stopping member 18 at the first, rescue rope end of the snare.

Figure 1B:
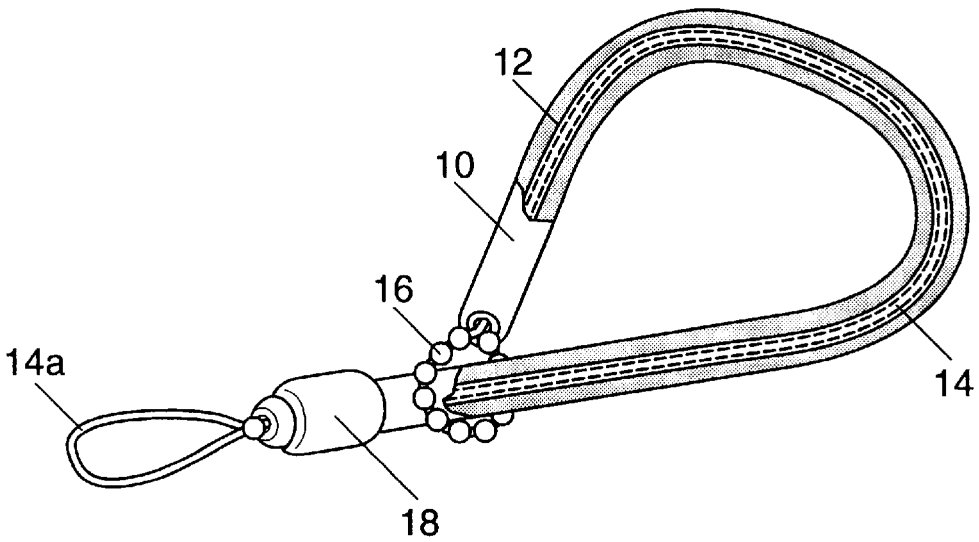
FIG 1*b* is a cross-sectional view, showing the interior of the flexible, buoyant elongate member of the device of FIG. 1*a;*

A variation on the embodiment of FIGS. 1*a* and 1*b* is shown in FIG. 2, where the tensile member extending from the stopped end of the snare is first looped into tie loop 14*a* and thence extends into a tag line 14*c* with a handle 20.

In a further modification illustrated in FIG. 3, a rigid stopping member 18' is not longitudinally fixed relative to flexible, buoyant rod 10, but with a selected degree of frictional engagement can be manually pulled along rod 10 against slippage/roller means 16 to cinch the loop tighter around the chest of the wearer, as desired. The adjustable snare retainer 18' is prevented from sliding off rod 10 at the rescue rope end by a fixed abutment 22, such as a washer secured to the end of the snare.

Figure 5:
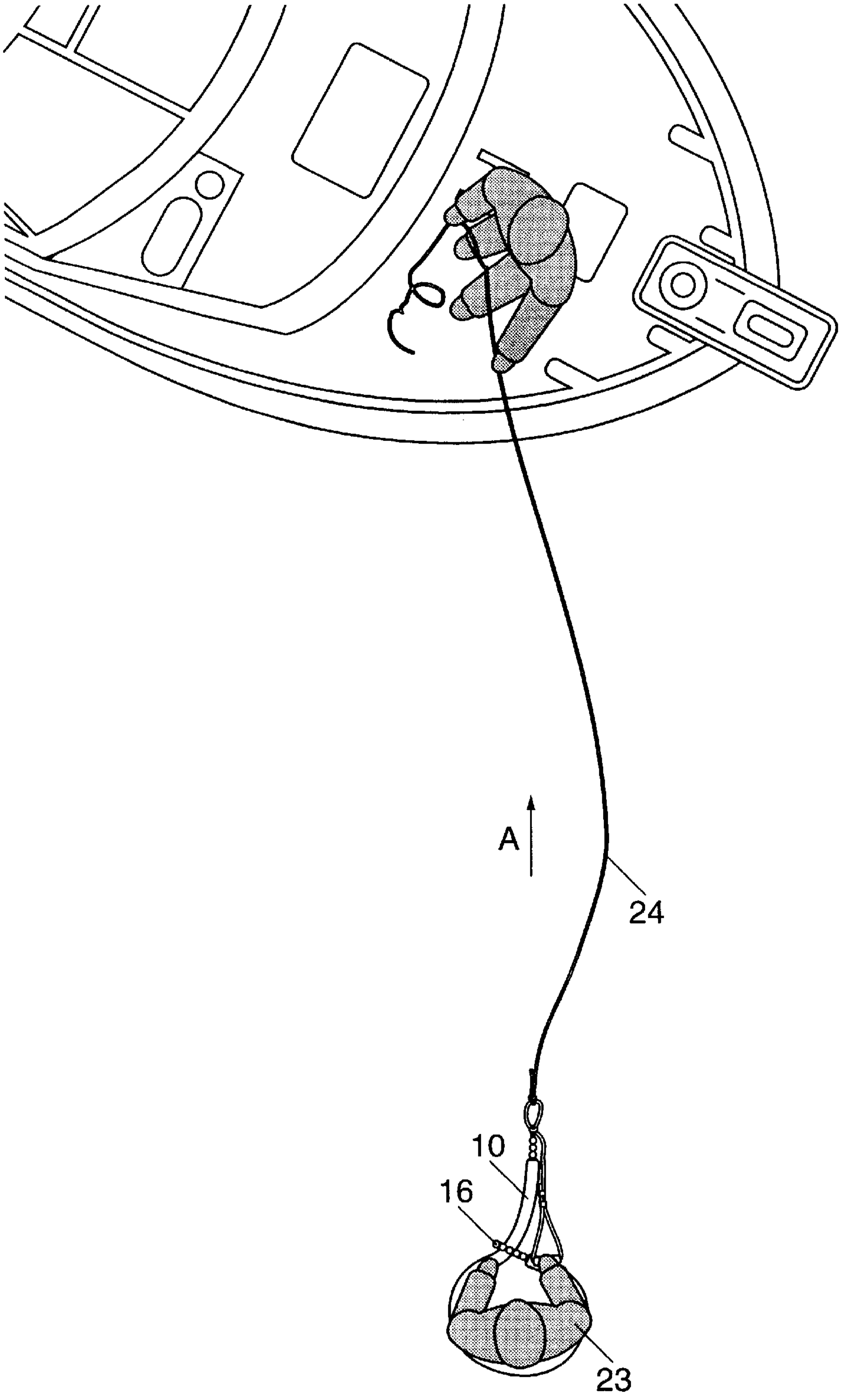
FIG. 5 illustrates the rescue of an overboard victim using a marine rescue flotation snare according to the present invention, thrown from a boat.

Referring to FIG. 5, after the snare is thrown out to victim 12 and the victim 23 has put his or her arms through the expanded loop of the device, pulling the rescue line 24 in the direction illustrated generally by arrow A will effect cinching of the snare around the body of the victim by virtue of the free-sliding end 16.

Figure 6:
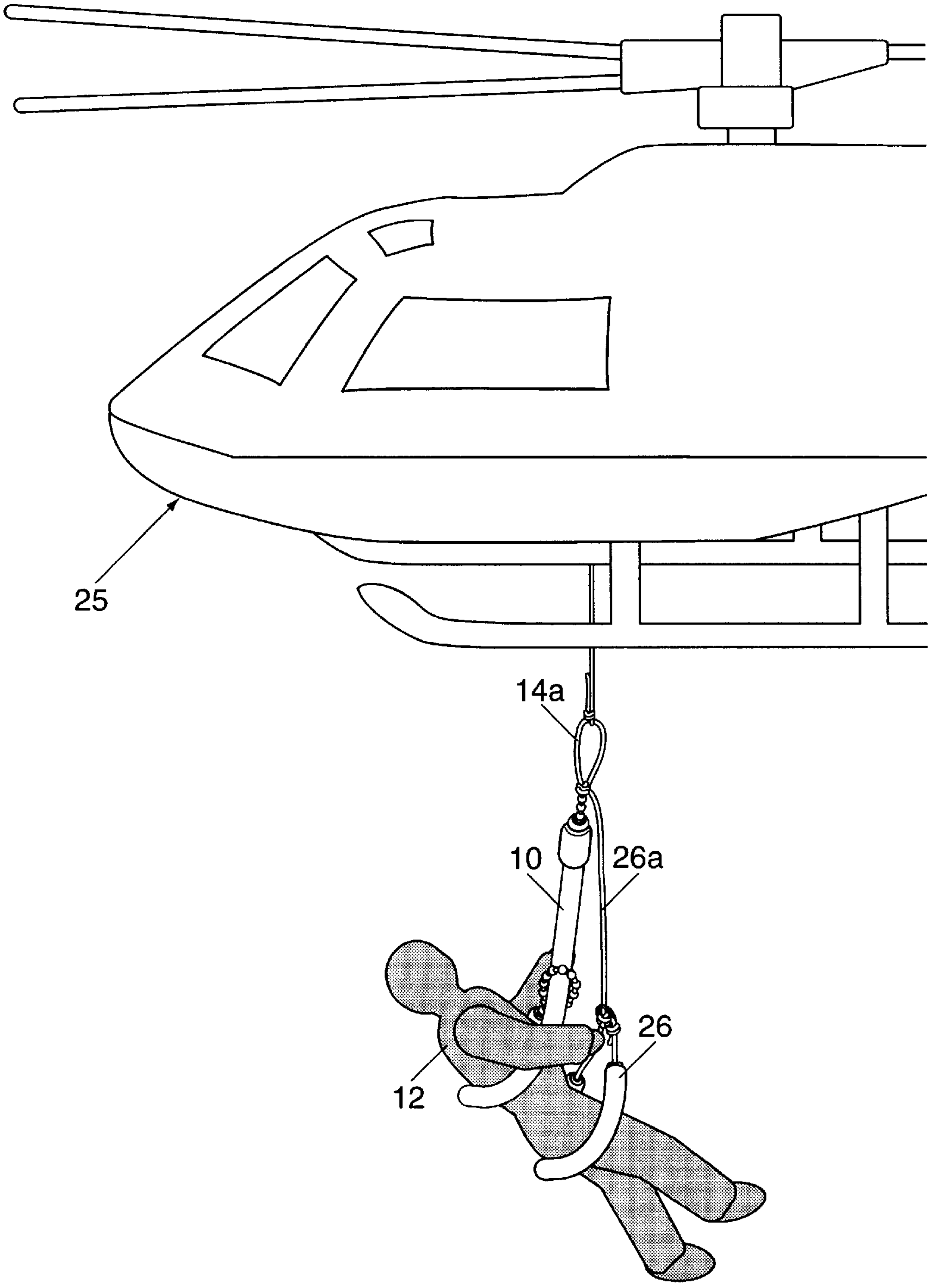
FIG. 6 illustrates the vertical lifting by a rescue helicopter of a victim whose upper torso is secured by a rescue snare of the kind shown in the previous Figures.

As shown in FIG. 6, this snaring action is also advantageous in "vertical work" as when the victim must be lifted out of the water by a rescue helicopter 25. For this purpose, the rescue device may optionally be provided with a cradle strap 26 attached by a separate line 26*a* to the tow-rope end of rescue snare 10.

Figure 4A:
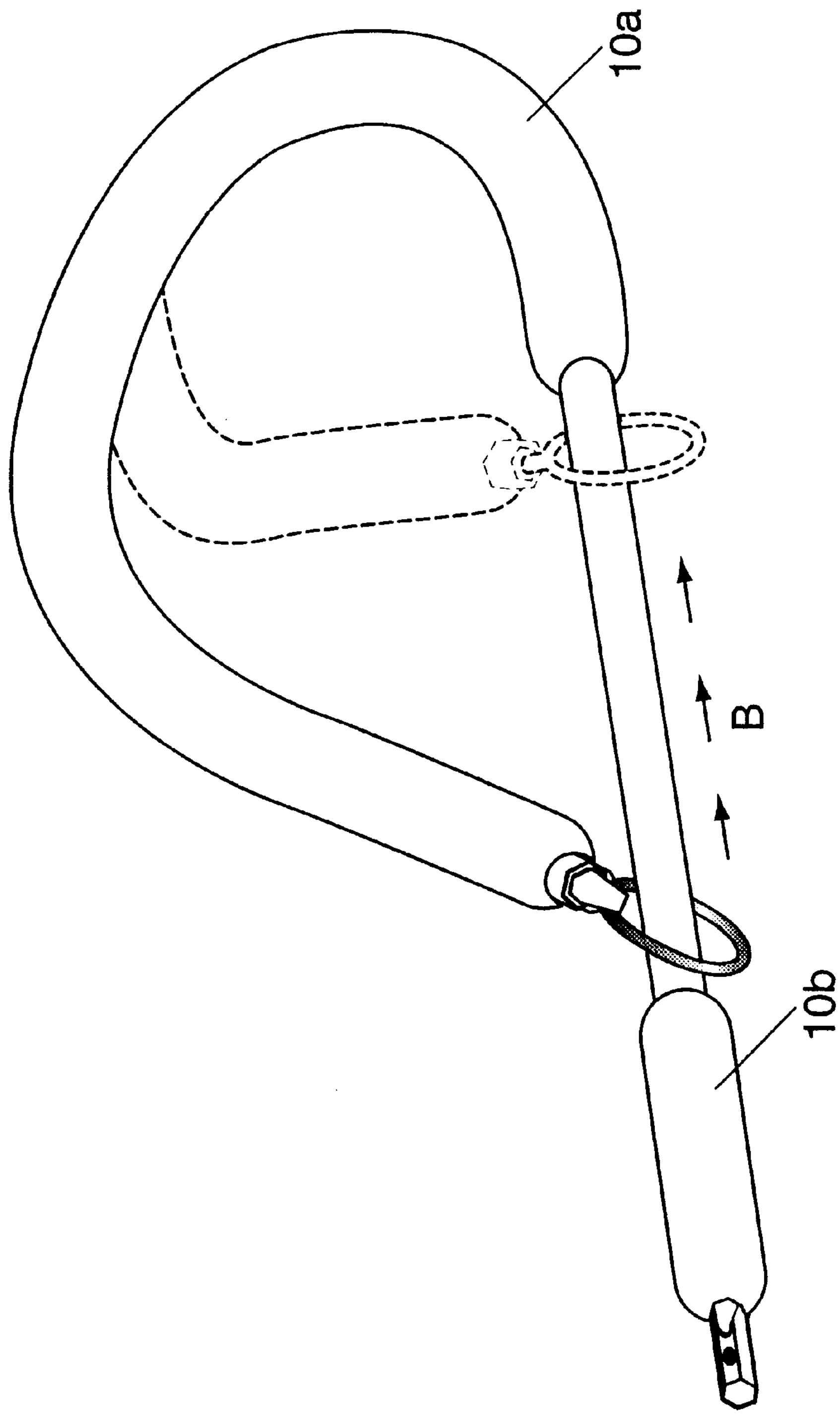
FIG 4*a* is a diagrammatic representation of a marine rescue snare according to a preferred embodiment of the invention.
Figure 4B:
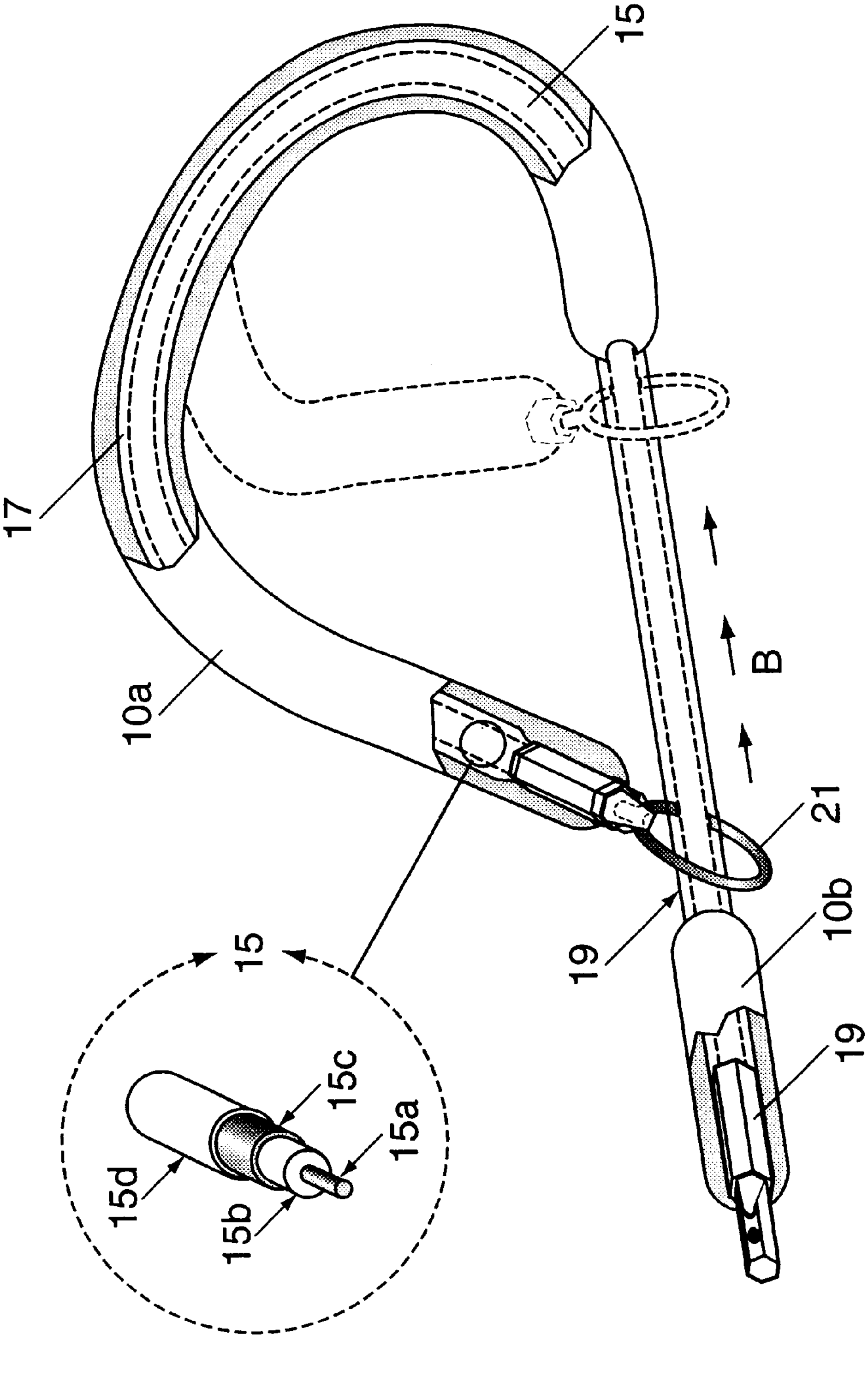
FIG. 4*b* is a sectional view of the embodiment of FIG. 4*a* including an exploded fragmentary view to show the construction of the co-axial cable used in this embodiment.

FIGS. 4*a* and 4*b* illustrate a currently preferred embodiment of the snare according to the present invention, in which the snare is formed of two sections of flexible buoyant rod, 10*a* and 10*b,* connected through central channels by a flexible tensile member 15 which is constructed as a semi-rigid buoyant cable.

Such a cable is the subject of the present applicant's U.S. Pat No. 5,370,434. The distinguishing property of this cable is that it is essentially semi-rigid, by which it is meant that the cable is flexible while at the same time substantially non-resilient, so that it will retain the shape into which it is flexed.

The coaxial structure of cable is from the inside out comprises a fibreglass centre core 15*a,* surrounded by polyethylene foam 15*b,* and aluminum sheath 15*a* and, as the outermost layer of the cable a polyethylene sheet 15*d.* Optionally in this embodiment, the flexible tensile member 15 may be enwrapped by a hollow polyester webbing material 17. The cable may be provided at both ends with an aluminum hex fitting for connection to the slippage means and external towing means.

The portion 19 of the cable which extends between the polyethylene foam covered sections serves as the loosening-tightening track along which sliding member 21 is free to move in the direction of arrows B toward the extreme tightest configuration illustrated in dotted outline, or in the reverse, loosening direction.

Just as with the embodiment of FIGS. 1 to 3, the snare of the FIG. 4 has the ability to be attached to a rescue rope and thrown to a victim. Once around the victim the snare can be tightened up to secure a rescue link with the victim and to keep him or her afloat. I have found that the particular embodiment of FIGS. 4*a* and 4*b* is less bulky than the others and for that reason more convenient to store and easy to throw out to a victim in use.

It will be appreciated that, although specific embodiments of the invention have been described herein for purposes of illustration, various modifications may be made without departing from the inventive concept. Accordingly, the invention is not limited except by the claims appended hereto.

I claim:

1. A marine rescue snare, comprising:

at least one flexible, buoyant elongate member having an axial channel therethrough with a first end and a second end;

a flexible tensile member extending through said axial channel from said first to said second end thereof;

means for connecting said flexible tensile member at said first end to a rescue rope; and slippage means connected to said flexible tensile member at said second end for maintaining said snare, in use, in the form of a loop accommodating the upper torso of a person to be rescued, while permitting relative movement of first and second ends of the snare away from or toward each other for respectively contracting or expanding said loop.

2. A marine rescue snare according to claim 1, wherein a hollow elastomeric tube is seated in close fit along the length of said channel, said flexible tensile member extending through the interior of said tube.

3. A marine rescue snare according to claim 2, wherein said slippage means comprises a ring of plastic roller beads looped about said flexible buoyant elongate member between said first and second ends.

4. A marine rescue snare according to claim 3, wherein said tensile member is a rope having a polypropylene core and an outer polyester sheath, a portion of said tensile member extending from said first end of said axial channel being securely formed into a tie loop for connection of a rescue rope thereto.

5. A marine rescue snare according to claim 3, further comprising end stop means for enlarging the diameter of a portion of said elongate member near the first end thereof to limit the motion of said second end of the snare in expanding said loop.

6. A marine rescue snare according to claim 5, wherein said end stop means is manually adjustable along said buoyant elongate member for manual cinching of the loop of the snare about the torso of a person.

7. A marine rescue snare according to claim 1, wherein said flexible tensile member is a length of semi-rigid, non-resilient cable joining two flexible, buoyant elongate members and wherein an exposed portion of said cable serves as a track for movement therealong of said slipping means.

8. A marine rescue snare according to claim 7, wherein said semi-rigid, non-resilient cable is a coaxial cable having a steel core, an aluminum sheath and a filling of lightweight plastic material.

9. A marine rescue snare according to claim 8, wherein said slippage means comprises a rigid metal ring fixedly attached to said cable at said second end of the axial channel through said flexible, buoyant elongate members.

* * * * *